(12) United States Patent
Reams

(10) Patent No.: US 8,713,425 B2
(45) Date of Patent: Apr. 29, 2014

(54) AUDIO/VIDEO PROGRAM-RELATED HYPERLINK PRINTER

(75) Inventor: David Anthony Reams, Rochester Hills, MI (US)

(73) Assignee: Progme Corporation, Rochester Hills, MI (US)

( * ) Notice: Subject to any disclaimer, the term of this patent is extended or adjusted under 35 U.S.C. 154(b) by 1079 days.

(21) Appl. No.: 12/687,945

(22) Filed: Jan. 15, 2010

(65) Prior Publication Data

US 2010/0146376 A1 Jun. 10, 2010

Related U.S. Application Data

(63) Continuation-in-part of application No. 11/318,713, filed on Dec. 27, 2005, now abandoned, which is a continuation-in-part of application No. 09/839,074, filed on Apr. 20, 2001, now abandoned.

(51) Int. Cl.
*G06F 3/00* (2006.01)

(52) U.S. Cl.
USPC .......................................................... 715/234

(58) Field of Classification Search
USPC .......... 715/208, 234, 243, 254, 255, 273, 274
See application file for complete search history.

(56) References Cited

U.S. PATENT DOCUMENTS

| 6,415,438 | B1 * | 7/2002 | Blackketter et al. ........... 725/136 |
| 6,507,410 | B1 * | 1/2003 | Robertson et al. ............. 358/1.18 |
| 6,795,973 | B1 * | 9/2004 | Estipona ........................ 725/136 |
| 2002/0056091 | A1 * | 5/2002 | Bala et al. ...................... 725/34 |
| 2003/0023971 | A1 * | 1/2003 | Martinolich et al. ........... 725/32 |

OTHER PUBLICATIONS

"Class PrintWriter" <available from: http://docs.oracle.com/javase/6/docs/api/java/io/PrintWriter.html>, pp. 1-19.*

* cited by examiner

*Primary Examiner* — Kyle Stork

(57) ABSTRACT

A system is disclosed for hyperlinking to hyperlinked content corresponding to program material wherein the hyperlinking prints only pre-defined printable output of the hyperlinked content comprising a generator for generating a hyperlink address string associated with the program material including a first attribute indicating a hyperlink address to the hyperlinked content and a second attribute indicating one or more parameters defining the pre-defined printable output of the hyperlinked content, an encoder for encoding the hyperlink address string for transmission via a program signal transmitter, the program signal transmitter for transmitting the hyperlink address string, a program signal receiver for receiving the hyperlink address string, a data processor for processing the hyperlink address string for hyperlinking to the hyperlinked content printing only the pre-defined printable output of the hyperlinked content and a web browser for hyperlinking to the hyperlinked content printing only the pre-defined printable output of the hyperlinked content.

25 Claims, 3 Drawing Sheets

AUDIO/VIDEO PROGRAM-RELATED HYPERLINK PRINTER

CROSS REFERENCE TO RELATED APPLICATIONS

This application is a continuation-in-part application of U.S. patent application Ser. No. 11/318,713 filed Dec. 27, 2005, now abandoned, which was a continuation-in-part application of U.S. patent application Ser. No. 09/839,074 filed Apr. 20, 2001, now abandoned, the disclosure of which applications is incorporated herein by reference.

BACKGROUND OF THE INVENTION

1. Field of the Invention

The invention relates to the field of hyperlinking to and printing hyperlinked content corresponding to radio or television program material. In particular, the invention relates to the field of hyperlinking to hyperlinked content corresponding to radio or television program material wherein the hyperlinking prints only pre-defined printable output of the hyperlinked content corresponding to the radio or television program material.

2. Description of the Related Art

Radio and television programs often broadcast content that is available to be hyperlinked to during the program. Prior art systems teach hyperlinking to content related to program material such as a coupon during an advertisement. Blackketter (U.S. Pat. No. 6,415,438); Estipona (U.S. Pat. No. 6,795,973); Bala, et al (US 20020056091).

Content hyperlinked to in said prior art systems is generally content that is printable. Adding printing utility to said prior art systems, however, would require adding print activation means on top of the existing hyperlink activation means in said prior art systems. It would be beneficial to combine activation of hyperlinking with activation of printing so that only one activation is required to activate both hyperlinking to and printing program-related content.

In addition, the portion of such content desirable for printing is typically less than the entire portion of the hyperlinked content. Consequently, said prior art systems teach against hyperlinking to said hyperlinked content wherein said hyperlinking prints pre-defined printable output of said predetermined hyperlinked content.

SUMMARY AND OBJECTS OF THE INVENTION

The invention integrates hyperlinking to and printing program-related content so that hyperlinking to the content prints the content. Specifically in the invention, hyperlinking to predetermined hyperlinked content corresponding to predetermined program material prints predetermined printable output of said predetermined hyperlinked content.

One object of the invention is to integrate hyperlinking to and printing hyperlinked content related to program material.

Another object of the invention is to combine in the same hyperlink address string hyperlinking attributes and values and printing attributes and values.

Yet another object of the invention is to enable hyperlinking to predetermined hyperlinked content corresponding to predetermined program material to print pre-defined printable output of said predetermined hyperlinked content.

Additional objects will be apparent from the following detailed description.

BRIEF DESCRIPTION OF THE DRAWINGS

The features and advantages of the present invention can be understood by reference to the detailed description of the preferred embodiments set forth below taken with the drawings, in which.

DETAILED DESCRIPTION OF EXEMPLARY EMBODIMENTS OF THE INVENTION

Figure 1:
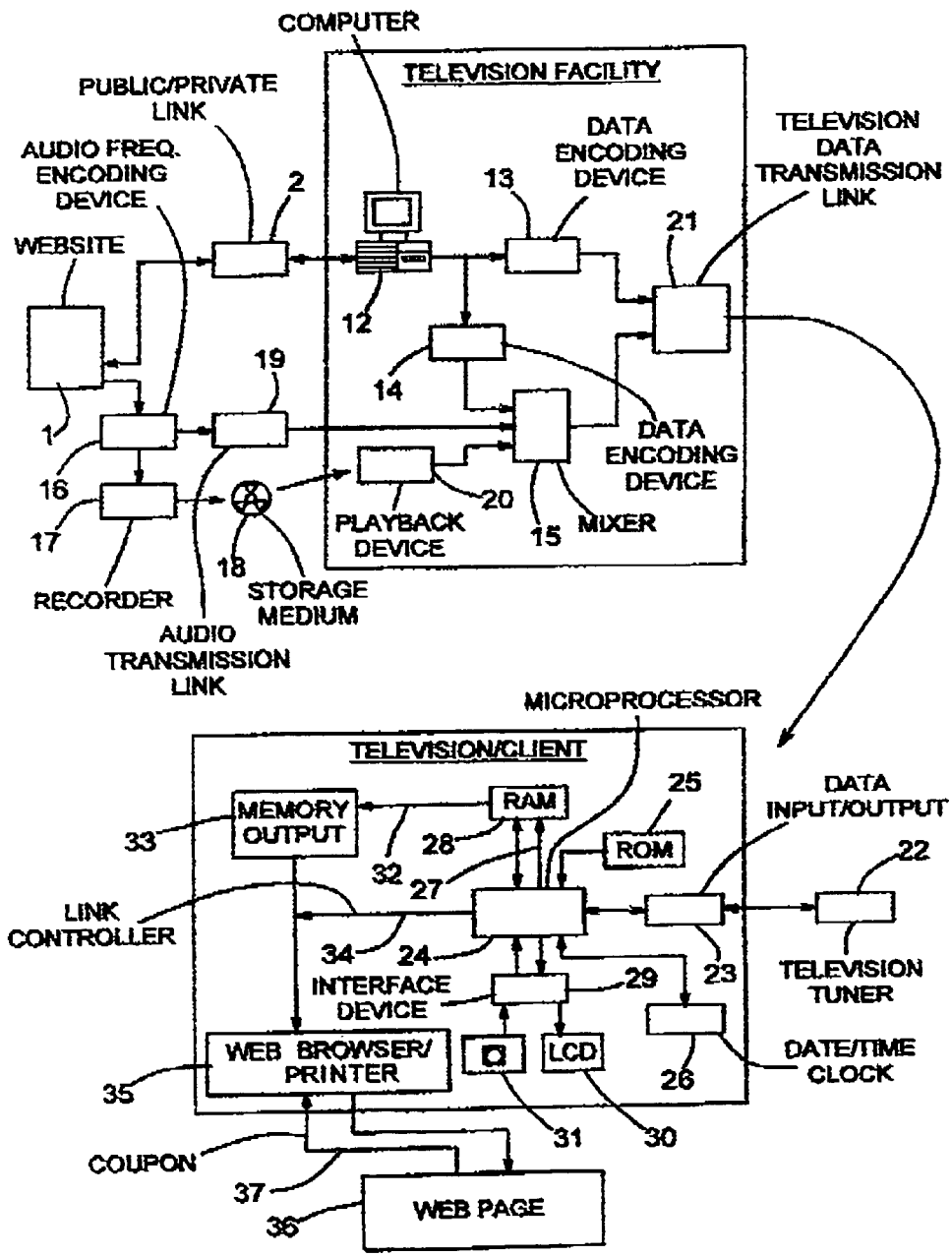
FIG. 1 is the system of the present invention.

"Program material" as used herein may be audio or video commercial, sports, news, entertainment or non-commercial program material. The term "coupon" is defined herein expansively as in Engel, et al, U.S. Pat. No. 5,907,830, which is incorporated herein by reference, to include any printable certificate used to obtain anything of interest to a potential consumer such as special pricing, a discount, money, samples or additional product, premiums, rebates or any other thing of value or interest. Other printable content that may be related to program material and printed out in the instant invention may be other supplemental information related to commercials, additional audio sound tracks or additional visual information including information about the characters, storylines and background information related to the program, close-ups of specific items within the program material, alternative camera angles for video program material, alternative scenes and dialogue for characters, image triggers tied to particular images on screen such as a individual's face, articles of clothing or a can of soda linking to a web page containing information about an associated product or service and interactive prompts/sequences for the viewer to select.

The term "hyperlink", as used herein, includes a link to retrieve and render Internet or locally stored content such as text, graphics, sound, video or images. Hyperlinking behavior may be described as "seeking" the document wherein seeking in this sense means to advance the document timeline to the specified time as specified in http://www.w3.org/TR/2001/REC-smil-animation-20010904/, which is incorporated herein by reference. Said hyperlinking may require one or more user agents including a browser application and, to retrieve and render SVG content, an SVG user agent as specified in http://www.w3.org/TR/SVG/intro.html#Terminology, which is incorporated herein by reference. In addition, said hyperlinking may be activated in the instant invention by an actuate attribute or timing instructions contained in a timing attribute such as begin, dur, end, restart, repeatcount, repeatdur and fill or an event attribute without any actuate attribute. Said begin timing attribute may define when an element becomes active and said event attribute may have a value describing the event and an optional offset (for example, to account for any transmission time taken to fetch the content via hyperlink) that determine element begin time, any event being an user-interface event, an event trigger transmitted with the program signal or any other event specified in http://www.w3.org/TR/DOM-Level-2-Events/events.html#Events-eventgroupings-, which is incorporated herein by reference. Further, the instant invention support interactive timing of animation elements to allow the author to specify that an animation should begin or end in response to an event (such as an user-input event like "click"), another hyperlink activation or a DOM method call to begin or end animation using the special value "indefinite" as specified in http://www.w3.org/TR/2001/REC-smil-animation-20010904/.

The pre-defined printable output of the predetermined hyperlinked content may comprise a multimedia document with at least on of the following components: text, image, animation, video, streaming video or audio converted to image or text. Said pre-defined printable output of said predetermined hyperlinked content may be printed out to paper or file.

The invention disclosed herein comprises a computer-implemented system for hyperlinking to predetermined hyperlinked content corresponding to predetermined program material wherein said hyperlinking prints only pre-defined printable output of said predetermined hyperlinked content comprising: means for generating a hyperlink address string including a first attribute indicating a predetermined hyperlink address to said predetermined hyperlinked content corresponding to said predetermined program material and a second attribute indicating one or a plurality of predetermined parameters defining said pre-defined printable output of said predetermined hyperlinked content; means for encoding operably coupled to said means for generating for encoding said hyperlink address string for transmission via means for transmitting program signals; said means for transmitting program signals operably coupled to said means for encoding for transmitting said hyperlink address string to means for receiving program signals; said means for receiving program signals for receiving said hyperlink address string; means for processing operably coupled to said means for receiving program signals for hyperlinking to said predetermined hyperlinked content printing only said pre-defined printable output of said predetermined hyperlinked content: A) processing said predetermined hyperlink address indicated in said first attribute to hyperlink to said predetermined hyperlinked content and B) processing said one or a plurality of predetermined parameters defining said pre-defined printable output of said predetermined hyperlinked content indicated in said second attribute for said hyperlinking to said predetermined hyperlinked content printing only said pre-defined printable output of said predetermined hyperlinked content and means for hyperlinking operably coupled to said means for processing for hyperlinking to said predetermined hyperlinked content wherein said hyperlinking to said predetermined hyperlinked content prints only said pre-defined printable output of said predetermined hyperlinked content according to said one or a plurality of predetermined parameters defining said pre-defined printable output of said predetermined hyperlinked content indicated in said second attribute. Said hyperlink address string may include one or more additional attributes indicating a spatial, temporal and/or an interactive aspect of said hyperlinking.

In one embodiment herein, said second attribute indicating at least one parameter defining said pre-defined printable output of said predetermined hyperlinked content may indicate a descriptor, Digital_Copy_Control_Descriptor, authorizing the printing of at least one copy of said pre-defined printable output (for example, copy one only "10"). If indicated, such descriptor may be included in at least one program table, e.g. EIT, PMT or SDT, transmitted in the transport stream.

Figure 2:
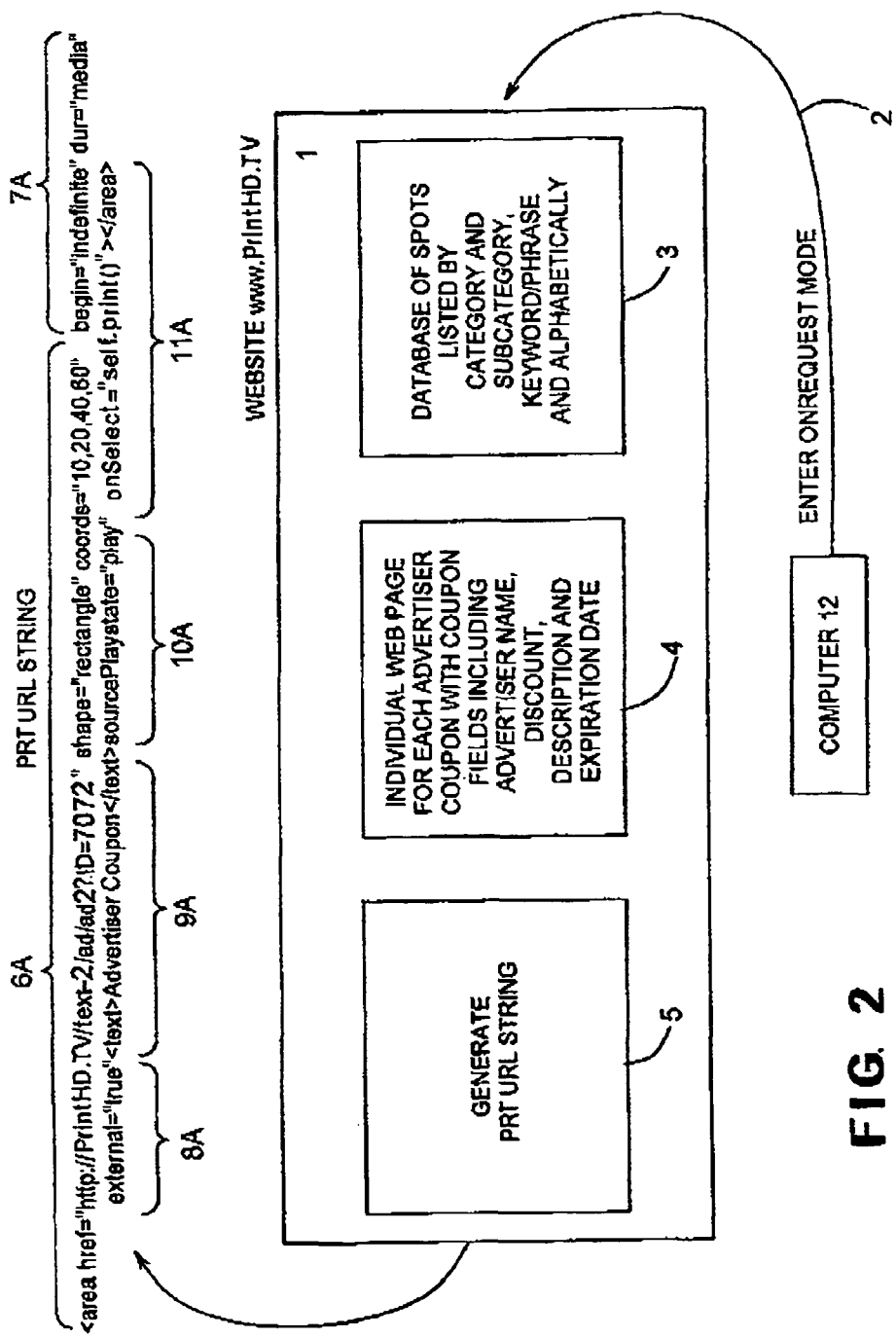
FIG. 2 shows one hyperlink address string that may be generated by the present invention.

Referring to the Drawing FIG. 2, TELEVISION FACILITY COMPUTER 12 may access WEBSITE 1 via PUBLIC/PRIVATE LINK 2, which may be the public switched telephone network, an integrated digital network or similar wire or wireless facility, to encode an advertisement with an URL string including an URL to a web page having at least one coupon related to said advertisement. While the Drawing and system description herein are substantially specific to television facilities, it is understood that such specification is for illustrative purposes only and the Drawing and system description apply equally to broadcast, cable, satellite and Internet television and radio facilities and any video or audio recording medium.

Via WEBSITE 1 data entering means TELEVISION FACILITY may search DATABASE 3 of advertisements ("spots") and associated URLs to coupon web pages (each located as INDIVIDUAL WEB PAGE 4 at WEBSITE 1 or at the advertiser website) to select a spot scheduled to be advertised. Said spots and associated URLs may be listed in DATABASE 3 by predetermined category such as media market and predetermined subcategory such as product/service, key word/phrase and alphabetically. When a spot is selected, the associated URL to the web page having at least one advertiser coupon may be automatically entered in said URL string and the text "[Advertiser Name] Coupon", using the selected advertiser name, may be automatically generated in said URL string as text identifying said at least one coupon related to said advertisement. TELEVISION FACILITY may alternatively directly enter via said data entering means a spot of interest and/or an associated URL to a web page having at least one advertiser coupon and said text identifying said at least one coupon related to said advertisement without selecting said spot from DATABASE 3.

Figure 3:
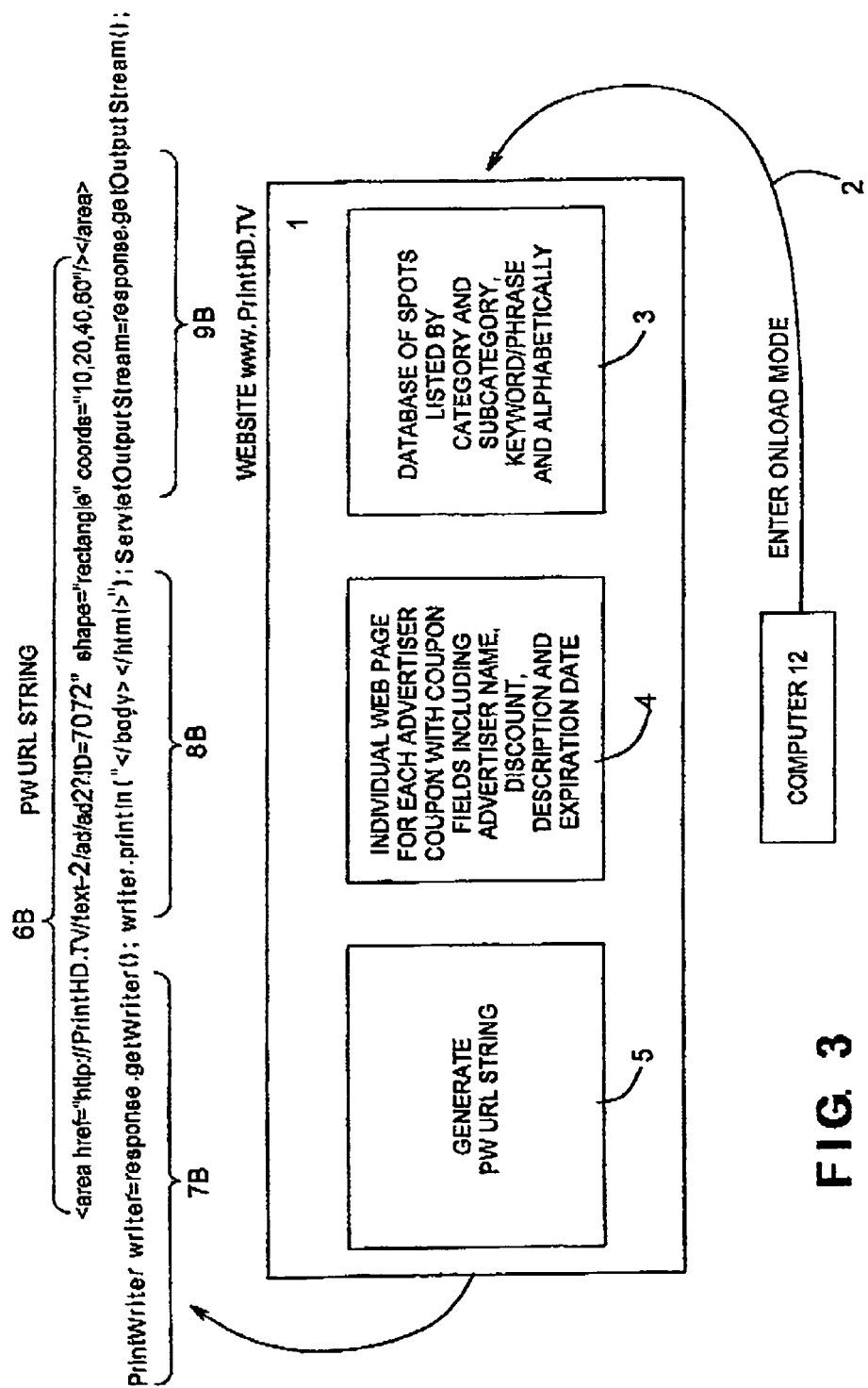
FIG. 3 shows another hyperlink address string that may be generated by the present invention.

Referring to the Drawings FIG. 2 and FIG. 3, said system may further include the step of entering 2 via data entering means to database means operably coupled to said generating means: said predetermined hyperlink address and predetermined hyperlink activation data for said user-activated, ONREQUEST, or automatically, ONLOAD, activating said hyperlink to said predetermined hyperlinked content including: predetermined user-activation data for said user-activating said hyperlink or predetermined automatic activation data for said automatically activating said hyperlink.

The URL STRING described herein may utilize the international Synchronized Multimedia Integration Language (SMIL) standard specified in http://www.w3.org/TR/SMIL2/, which is incorporated herein by reference. SMIL is an XML-based language, a "presentation description language", that allows authors to write interactive multimedia presentations. While one embodiment of the invention is described utilizing the SMIL format, the media objects may be implemented in any other format such as any JPEG format, any Graphics Interchange Format (GIF), audio or digital audio formats, Audio IFF, Computer Graphics Metafile, TIFF, BIFF, bmp, Clear, FITS, NFF, OFF, PCX, PNG, TGA, XBM, mod, any Moving Picture Experts Group (MPEG) format, Musical Instrument Digital Interface, PICT, PNG, Portable Document Format (PDF), Portable Network Graphics, Portable Pixmap, progressive coding, Quicktime, RIFF, Self Extracting Archive, sequential coding; server-parsed HTML, sprite, Tagged Image File Format, targa, Targa Graphics Adaptor, thumbnail, way, WebCGM, wireless bitmap, xpm or a different frame rate video.

Using SMIL, an author can describe the temporal behavior of a multimedia presentation, associate hyperlinks with multimedia objects and describe the layout of the presentation on a screen. Further, using SMIL media components may be named for text, images, audio and video with URL's to schedule their presentation either in parallel or in sequence. The presentation may be composed of several components that are accessible via the URL's, e.g. files stored on a web server, each having a different media type such as audio, video, image or text with the begin and end times of different components specified relative to events in other media components and the presentation links to components via hyperlinks. Supplemental multimedia information may also be accessed via hyperlinks to locally stored files which may have been pre-fetched and are stored at lid URL addresses. In addition to HDTV, High Definition (HD) Radio may use SMIL for multimedia encoding, transmission and receiver processing pursuant to http://www.ibiquity.com/technology/documents/SY_AAS.sub.—5033.sub.—002.-pdf, the HD Radio-SMIL specification.

I. Generating and Transmitting Hyperlink Address String

The invention includes a method of generating a hyperlink address string for hyperlinking to predetermined hyperlinked content corresponding to predetermined program material wherein said hyperlinking prints only pre-defined printable output of said predetermined hyperlinked content including the step of: generating via means for generating an hyperlink address string including a first attribute indicating a predetermined hyperlink address to said predetermined hyperlinked content corresponding to said predetermined program material and a second attribute indicating one or a plurality of predetermined parameters defining said pre-defined printable output of said predetermined hyperlinked content. Said method may further include entering via means for entering said predetermined hyperlink address and/or said one or a plurality of predetermined parameters defining said pre-defined printable output of said predetermined hyperlinked content to means for storing data operably coupled to said means for generating. Said means for generating may comprise computer means, either a website or receiver computer means. Said hyperlink address string may comprise a character string and said predetermined hyperlink address comprises an URL. Said method may further include the step of encoding said hyperlink address string for transmission in conjunction with program signals representative of said predetermined program material.

URL <a or <area href/shape and coords attributes. The URLs may be a simple identifier or several lines of text characters to specify the actual address of URL addressable content, either local or interne. The href portion of this attribute comprises the first attribute in the hyperlink address string of the invention including the predetermined hyperlink address to the predetermined hyperlinked content. To enter the appropriate href attribute, an advertiser may first select the media being used to transmit the spot, HD Radio <a href, HDTV <area href or Media Player Audio <a href or Video <area href. The value of the href attribute the URL of the link's destination, may be automatically entered in SMIL URL STRING once entered as an advertiser's URL to WEB PAGE 36. While the <a href element associates a link, href attribute, with a complete media object, the <area href element using the shape and coords attributes associates the link with spatial portion(s) of an object's visual display. In addition, the area element allows breaking up an object into temporal subparts using begin and end attributes. Area (and a) element attributes include actuate, shape, coords, href, begin, end, dur, sourcePlaystate and external. Pursuant to said HD Radio-SMIL specification, HD Radio is to utilize only the <a href element to reference an URL link because the <area> element implies a display which can be partitioned. Since there is no shape or coords attributes associated with the <a href URL attribute, the shape and coords attributes are not included in the SMIL URL String <a href attribute. In said predetermined hyperlink address the shape attribute specifies the shape of the hyperlink display with the values of rectangle shape="rectangle", circle shape="circle" or polygon shape="polygon". The coords attribute specifies the relative position of the hyperlink display on the screen and include the following values: coords="0,0,50,50" (Upper Left), coords="50,0,100,50" (Upper Right), coords="0,50,50,100" (Lower Left), coords="50,50,100,100" (Lower Right), coords="25,25,75,75" (Center) and coords="10,20,40,60" (Lower Center).

Said hyperlink address string may further comprise a third attribute indicating predetermined hyperlink activation for hyperlinking to said predetermined hyperlinked content wherein printing said pre-defined printable output of said predetermined hyperlinked content is activated by said activation of hyperlinking to said predetermined hyperlinked content. Said one or a plurality of predetermined parameters defining said pre-defined printable output of said predetermined hyperlinked content may comprise at least one parameter specifying a predetermined spatial or temporal aspect of said predetermined hyperlinked content.

Timing attributes begin, end and dur. To enter the appropriate timing attributes, an advertiser may enter 2 to DATABASE OF SPOTS LISTED BY CATEGORY AND SUBCATEGORY, KEYWORD/PHRASE AND ALPHABETICALLY 3 the desired URL hyperlink activation mode, user-activated (ONREQUEST) begin="indefinite" dur="media" 7A or automatically activated (ONLOAD) begin="dd:hh:mm:ss.0.sup.1-n" and end="dd:hh:mm:ss.0.sup.1-n" (NOT SHOWN), day, hour, month, second, fraction of second start/end times scheduled, for example, in 1-n spots in an advertising campaign. The value of "indefinite" for the begin attribute signals that the beginning of the element is determined by user hyperlink activation during the playing of associated program material and the dur attribute value of "media" (the "dur" is the media duration). Another value for the dur attribute may be a clock value. If there is more than one begin and end value, such as to specify the start and end date/times in several spots scheduled to run in a television or radio advertising campaign, the next begin time is always the earliest begin time after the current time as determined by SMIL player clock and each respective begin and end value is separated by a semi-colon (;). Time values to begin and to end are relative to the beginning of the associated media object, i.e. television spot having related coupon web page for viewers to access. There is no need for month and year date codes in the begin and end time attributes because, since the time is measured from the most recent time as determined by SMIL player clock, the month and year can be determined from the clock internally.

Timing attributes and timeline data structure used in SMIL for hyperlinking to predetermined printable content related to predetermined program material is also used in the invention for printing of said content. For example, an advertiser may specify that hyperlinking to and printing a spot-related coupon only take place while the ad is playing, e.g. between the SMIL begin and end or par values, or even immediately after the ad plays, e.g. pursuant to the SMIL seq time value. The SMIL dur value indicating the time value an object is to remain active could also indicate the same value for object printing. SMIL repeatCount and repeatdur indicating respectively the number of time and total amount of time an object will repeat could apply equally to object printing.

External/Internal attribute. The internal attribute defines whether or not the link destination is opened by a current or an external application, defining whether or not the hyperlink is to another node in the same SMIL presentation or local memory with values of true or false, for example internal="true" 8A. In one embodiment disclosed herein, the apparatus may have a local, e.g. lid URL, hyperlink only so that apparatus does not comprise Internet web browser means and web page content may be transmitted in hyperlink address string or in advance of the hyperlink address string transmission ("prefetched") via the SMIL Prefetch Element (using the mediaSize attribute to define a relative amount of the object to prefetch, mediaTime attribute to define a relative amount of time to dedicate to prefetching and a bandwidth attribute defining the relative amount of bandwidth to dedicate to prefetching).

Actuate attribute. The URL hyperlink activation mode may be selected and entered 2 as either user-activated (ONREQUEST) or automatically activated (ONLOAD). If the ONREQUEST (user-activated) hyperlink activation mode is entered, which may be the default value for this attribute, the value of the actuate attribute may be <text>Advertiser Coupon</text> 9A or, if the ONLOAD (automatic) hyperlink activation mode is entered, the value may be actuate="on Load" (NOT SHOWN). The Company Name text may be automatically entered in the URL STRING text field upon user selection of the ONREQUEST hyperlink activation mode. Further, the attribute value actuate="on Load" (NOT SHOWN) may be automatically entered in the URL STRING upon user selection of the ONLOAD hyperlink activation mode. Unless actuate="on Load" (NOT SHOWN) is entered, the default value for the actuate attribute may be actuate="on Request", which on Request value as the default does not need to be specified expressly to indirectly specify or indicate user-activated hyperlink activation and instead <text>Advertiser Coupon</text> 9A may be entered to display text to prompt user hyperlink activation, for example for ONREQUEST <text>Advertiser Coupon</text> 9A and for ONLOAD actuate="on Load" (NOT SHOWN).

SourcePlaystate attribute. The sourcePlaystate attribute controls temporal behavior of the presentation containing the link when traversed. This attribute has 3 possible values: play, indicating when the link is traversed, the presentation containing the link continues playing; pause, when the link is traversed, the presentation containing the link pauses (to resume playing when the resource is completed) or stop when the link is traversed, the presentation containing the link stops without any resumption. An example of this attribute is sourcePlaystate="play" 10A.

In one preferred embodiment disclosed herein said data entering means and generating means may comprise website means or other database means, i.e. WEBSITE 1. In addition to web utility, the instant invention enables receivers such as STB receivers to generate code for Java TV applications. The description of the invention using website means for generating the hyperlink address string applies equally to the receiver generating the code.

Referring to FIG. 1, WEBSITE 1 may then output a generated URL string to either AUDIO FREQUENCY ENCODING DEVICE 16 to encode said URL string for transmission via program audio channel data transmission means or download said URL string to program signal transmitting means. AUDIO FREQUENCY ENCODING DEVICE 16 may inaudibly embed said URL string in the program audio itself Audio frequency encoded data signals may then be fed from AUDIO FREQUENCY ENCODING DEVICE 16 to RECORDER 17 and onto STORAGE MEDIUM 18, or, alternatively, sent through AUDIO TRANSMISSION LINK 19 (such as a network program distribution system) to MIXER 15 located at TELEVISION FACILITY to be mixed in with program audio signals. STORAGE MEDIUM 18 may be sent to TELEVISION FACILITY for later playback via PLAYBACK DEVICE 20. Said URL string may be downloaded via PUBLIC/PRIVATE LINK 4 to TELEVISION FACILITY to be processed and transmitted via TELEVISION DATA TRANSMISSION LINK 21 at appropriate times in conjunction with transmission of associated program signals. Downloaded via PUBLIC/PRIVATE LINK 4, COMPUTER 12 may then output said URL string to DATA ENCODING DEVICE 13 to encode said URL string for transmission via conventional program data channel means such as VBI, MPEG, subcarrier, etc. In the alternative, COMPUTER 12 may output said URL string to DATA ENCODING DEVICE 14 to encode said URL string for transmission via program audio channel means (i.e. embedding in program audio signals via MIXER 15).

Said URL string may be generated for transmission via dtvcc, using the same television transmit channel used for closed captioning, thereby making said URLs available virtually everywhere television programming is received and enabling the use of closed captioning tools to encode and broadcast the URLs. Preferably, however, said URL string may be transmitted via data packets in transport streams and, in the HDTV embodiment of the invention, the hyperlink address string is transmitted via ancillary data packets transmitted in a transport stream with corresponding program material.

II. Apparatus

The apparatus claimed herein is tied to and dependant upon said data entering means and generating means. Indeed, said apparatus is dependant on said data entering and generating means to receive the first and second attributes included in the hyperlink address string for hyperlinking and printing pre-defined printable output of predetermined hyperlinked content.

The program signal receiver apparatus of the invention is for hyperlinking to predetermined hyperlinked content corresponding to predetermined program material wherein said hyperlinking prints only pre-defined printable output of said predetermined hyperlinked content comprising: means for receiving program signals for receiving a hyperlink address string including a first attribute indicating a predetermined hyperlink address to said predetermined hyperlinked content corresponding to said predetermined program material and a second attribute indicating one or a plurality of predetermined parameters defining said pre-defined printable output of said predetermined hyperlinked content; means for processing operably coupled to said means for receiving program signals for hyperlinking to said predetermined hyperlinked content printing only said pre-defined printable output of said predetermined hyperlinked content: A) processing said predetermined hyperlink address indicated in said first attribute to hyperlink to said predetermined hyperlinked content and B) processing said one or a plurality of predetermined parameters defining said pre-defined printable output of said predetermined hyperlinked content indicated in said second attribute for said hyperlinking to said predetermined hyperlinked content printing only said pre-defined printable output of said predetermined hyperlinked content and means for hyperlinking operably coupled to said means for processing for hyperlinking to said predetermined hyperlinked content wherein said hyperlinking to said predetermined hyperlinked content prints only said pre-defined printable output of said predetermined hyperlinked content according to said one or a plurality of predetermined parameters defining said pre-defined printable output of said predetermined hyperlinked content indicated in said second attribute.

The program signal receiver apparatus may comprise a television receiver apparatus, a radio receiver apparatus and/or a media player apparatus. The means for receiving program signals within said program signal receiver apparatus may comprise tuner means.

The predetermined hyperlink address may comprise a local storage address or an Internet Web address. Said hyperlink address string may comprise a character string and said predetermined hyperlink address may comprise an URL or URI.

Said hyperlink address string may further include a third attribute indicating said means for hyperlinking is user-activated and further comprising: means for storing, means for visually displaying and means for user-activating, each operably coupled to said means for processing and collectively configured for user-activating said means for hyperlinking to hyperlink to said predetermined hyperlinked content, said means for storing to store for predetermined time said predetermined hyperlink address and said means for visually displaying to visually display for predetermined time predetermined data to prompt said user-activating said means for hyperlinking to hyperlink to said predetermined hyperlinked content, both said means for storing and said means for visually displaying responsive to said third attribute and said means for user-activating to activate said means for hyperlinking to hyperlink to said predetermined hyperlinked content. Said hyperlink address string may further include a third attribute indicating said means for hyperlinking is automatically activated and further comprising means for automatically activating said means for hyperlinking operably coupled to said means for processing and configured for automatically activating said means for hyperlinking to automatically hyperlink to said predetermined hyperlinked content responsive to said third attribute.

Said one or a plurality of predetermined parameters defining said pre-defined printable output of said predetermined hyperlinked content may comprise at least one parameter specifying predetermined print activation for activating printing of said pre-defined printable output of said predetermined hyperlinked content. Said one or a plurality of predetermined parameters defining said pre-defined printable output of said predetermined hyperlinked content may comprise at least one parameter specifying a predetermined spatial or temporal aspect of said predetermined hyperlinked content.

Referring to the FIG. 1, said program signal receiver apparatus may comprise a television receiver apparatus, a radio receiver apparatus and/or a media player apparatus. Said program signal receiving means may comprise tuner means, i.e. TELEVISION TUNER 22. TELEVISION TUNER 22 may receive said URL string transmitted via TELEVISION DATA TRANSMISSION LINK 21. Said program signal receiving means 22 may comprise any video or audio program receiver means such as broadcast, cable or satellite television or radio tuner means, set-top box means, Internet program signal receiver means or other program signal receiver means. In another embodiment, said program signal receiving means 22 may comprise storage medium means such as video or audio recorder or player means.

Via DATA INPUT/OUTPUT 23, said URL string may be input to MICROPROCESSOR 24 (which may comprise any conventional data processor, microprocessor, central processing unit or equivalent data processing means). ROM 25 may store the program of instructions which controls MICROPROCESSOR 24. Responsive to <text>Advertiser Coupon</text> 9A, MICROPROCESSOR 24 may route URL from <area href="http://PrintHD.TV/text-2/ad/ad2.asp?ID=7072" shape="rectangle" coords="10,20,40,60"/> 6A or <area href="http://PrintHD.TV/text-2/ad/ad2.asp?ID=7072" shape="rectangle" coords="10,20,40,60"/> 6B via BUS 27 to be temporarily stored in RAM 28, route <text>Advertiser Coupon</text> 9A via INTERFACE DEVICE 29 to be displayed as non-hypertext or, optionally, "hyperlink text" via LCD 30 and detect the URL expiration date/time from begin="indefinite" dur="media" 7A. The term "hyperlink text" as used herein encompasses the meaning including hypertext conferred thereon in Boden, et al, U.S. Pat. No. 5,930,512, Nielsen, U.S. Pat. No. 6,199,071, Carroll, et al, U.S. Pat. No. 6,154,205 and Kato, U.S. Pat. No. 5,809,512, which are incorporated herein by reference.

Said apparatus may further comprise: time measuring means, i.e. DATE/TIME CLOCK 26, operably coupled to said data processing means MICROPROCESSOR 24 for said data processing means MICROPROCESSOR 24 to determine when a time referenced by an attribute included in said hyperlink address string transpires. In one preferred embodiment, said URL expiration date/time attribute 7 may be detected and compared by comparing means with current date/time information from DATE/TIME CLOCK 26 first before one or more other attributes in said URL string is processed to ascertain first if said URL remains valid. DATE/TIME CLOCK 26 and/or said comparing means may be remote from or built-into said apparatus such as disclosed in Danneels, U.S. Pat. No. 5,602,992 or Maturi, et al, U.S. Pat. No. 5,559,999, which are incorporated herein by reference.

Said apparatus may further comprise: memory means RAM 28 and visual display means LCD 30, both operably coupled to said data processing means MICROPROCESSOR 24 and collectively configured for said user-activating said hyperlink to said predetermined hyperlink address responsive to said user-activating attribute <text>Advertiser Coupon</text> 9A, said memory means RAM 28 for storing for predetermined time said predetermined hyperlink address specified in said first attribute <area href="http://PrintHD.TV/text-2/ad/ad2.aspID=7072" shape="rectangle" coords="10,20,40, 60"/> 6A and said visual display means LCD 30 for visually displaying, optionally with a text blinking effects attribute, for predetermined time predetermined data <text>Advertiser Coupon</text> 9A to prompt said user-activating said hyperlink to said predetermined hyperlink address wherein <text>Advertiser Coupon</text> 9A serves as both said user-activating attribute and predetermined data for display, however, said predetermined data for display may be pre-stored as text or a graphic image in predetermined storage means in said apparatus, and user-activating means, i.e. PUSHBUTTON 31, operably coupled to said data processing means MICROPROCESSOR 24 for said user-activating said hyperlink to said predetermined hyperlink address.

If user-activating attribute <text>Advertiser Coupon</text> 9A is received in said URL string, an hyperlink to WEB PAGE 35 may be user-activated via PUSHBUTTON 31. Visual display means such as LCD 30 may be used to alert an user that user activation of said hyperlink is available to be made. LCD 30, for example, may visually display "[Advertiser Name] Coupon" as text or, optionally, hypertext from <text>Advertiser Coupon</text> 9A to inform viewers that an hyperlink to coupon WEB PAGE 35 is available. In addition to indicating when program-related URL in <area href="http://PrintHD.TV/text-2/ad/ad2.asp?B)=7072" shape="rectangle" coords="10,20,40,60"/> 6A is no longer valid, begin="indefinite" dur="media" 7A may specify a stop display time as well so that said display coincides with the time when coupon WEB PAGE 35 is available to be accessed.

LED or equivalent visual display means rather than LCD 30 may be used as said visual display means. In addition, user activation means other than PUSHBUTTON 31 may be used such as keypad or VRU. Activating PUSHBUTTON 31, directly or via remote control, may send a control signal to MICROPROCESSOR 24, which, in turn, may instruct RAM 28 to output the stored URL 6 via BUS 32 to MEMORY OUTPUT 33.

Both LCD 30 and PUSHBUTTON 31 may be built into a conventional remote control unit and communicably coupled to MICROPROCESSOR 24. INTERFACE DEVICE 29 may then connect to a conventional two-way infrared (IR) link coupled to said remote control unit to send and receive control signals.

Responsive to actuate="on Load" 9B, MICROPROCESSOR 24 may route the URL from <area href="http://PrintHD.TV/text-2/ad/ad2.asp?ID=7072" shape="rectangle" coords="10,20,40,60"> 6B via BUS 27 to LINK CONTROLLER 34 to automatically activate the URL hyperlink to WEB PAGE 36 at begin="dd:hh:mm:ss.0.sup.1-n" (NOT SHOWN). In addition, MICROPROCESSOR 24 may detect the URL expiration date/time from end="dd:hh:mm:ss.0.sup.1-n" (NOT SHOWN).

Upon said user-activated or automatic activation, an hyperlink to WEB PAGE 36 may be established via WEB BROWSER/PRINTER 35. Hyperlinked content may then be displayed and printed via PrintWriter 35 on TELEVISION SCREEN (NOT SHOWN) at the specified shape="rectangle" coords="10,20,40,60" location. COUPON 37 may then be printed without user activation pursuant to, for example, an HTML instruction included in said URL string, via WEB BROWSER/PRINTER 35. If not automatic, once images are displayed on the screen, the user may press PRINT BUTTON (NOT SHOWN) at WEB BROWSER/PRINTER 35 to commence printing in order to print a certain displayed image.

In addition to automatic hyperlink activator, LINK CONTROLLER 34 may also serve as an hyperlink de-activator. For example, LINK CONTROLLER 34 may automatically de-activate an advertisement-related hyperlink to an advertiser coupon WEB PAGE 35 when the advertisement ends. In said embodiment, begin="indefinite" dur="media" 7A or begin="dd:hh:mm:ss.0.sup.1-n" end="dd:hh:mm:ss.0.sup.1-n" (NOT SHOWN) may reference an automatic hyperlink de-activate HTML or XML instruction.

A. Print to Paper Printing

First Exemplary Embodiment

One embodiment of the invention entails printing content to paper using an printer attached to a program receiver. Web browsers may be connected to program receivers for added functionality including hyperlinking and printing means that are inherent in web browser technology.

Print data may be transmitted with the program signal or referenced at a remote location such as on the Internet. XHTML-Print may be used by the hyperlinking and printing means to print the pre-defined printable output of the predetermined hyperlinked content. In XHTML-Print, the audio/video program signal may carry the extra information for printing referenced content wherein a tag may correlate the printable content with the corresponding broadcast program content.

Content to be printed may be transmitted in a transport stream via an object carousel along with corresponding program material. Such content to be printed may be described by a Link_Descriptor( ) pointing to predetermined content located at a transport stream URL. In such system using the Link_Descriptor( ) hyperlinking is accomplished via a link table containing the Link_Descriptor( ) for each program element having a hyperlink wherein the ID field of the link table uniquely identifies a destination page to which the program element is linked and a program ID field contains the program ID of the program that carries the destination page. The carousel may transmit 10 program elements in each program with 9 containing pages and 1, the first, containing metadata describing the other 9 pages. Each group of 9 pages may be image pages corresponding to the program mapped to a digital channel for access. To display a page, the STB browser tunes to the appropriate digital channel and selects the appropriate program element (service component). The browser also selects metadata from the first page to execute the link. A maximum of 6,700 page images may be carried by one carousel.

The print to paper embodiment of the invention is demonstrated in FIG. 2. This print to paper embodiment of the invention entails printing to paper using, preferably, the web browser printer. The hyperlink address string may then be designed to automatically invoke the browser interpreting the second attribute defining the pre-defined printable output of hyperlinked content using script to send such printable output to the printer. For demonstrative purposes only, the predetermined hyperlink address in the generated URL String, for the first exemplary embodiment (print to paper) disclosed herein, is <area href="http://PrintHD.TV/text-2/ad/ad2.aspHD=7072" shape="rectangle" coords="10,20,40,60" 6A.

Print ( ) attribute. The Print ( ) attribute may comprise at least one parameter defining the pre-defined printable output of the predetermined hyperlinked content. Thereby, this attribute may define such pre-defined printable output of the predetermined hyperlinked content. In FIG. 2, this attribute has the value, for demonstrative purposes only, of on Select="self.print( )" 11A, indicating to send the content in focus, such as during an advertisement an advertiser coupon located at http://PrintHD.TV/text-2/ad/ad2.aspHD=7072 6A, a file hyperlinked to via an object carousel at a transport stream URL or a frame currently being displayed, to the printer. The script "self.print( )" defines only pre-defined printable output of hyperlinked content such as the coupon, file or frame currently in focus to send to printer.

The first attribute to hyperlinked content and second attribute defining the printable output may include any appropriate parameter for defining printable output such as to print an image iframe img src="images/display/printer.gif" width="24" alt=" " title="Print"onclick="printPic( )"/ wherein printPIc( ) calls window.open(url, name, options) or to print an iframe <iframe src="page2print.htm" name="ifr" height="0" width="0" frameborder="0" onClick="frames ['ifr'].print( )"></iframe>. Changing onClick to on Load will cause the print window dialogue box to pop-up when the page loads. Other exemplary embodiments of such hyperlink address string may comprise img src="page2print.htm", txt src="page2print.txt", videosrc="page2print.mpg" or, with reference to a map such as <map name="pages2print.Map">, <area href="page2print.htm" shape=" . . . " coords=" . . . ">, and rather than onClick="self.print( )" 11B said second attribute as onClick="printFile( )", onClick="printUri( )", onClick="printScreen( )" or onClick="printTemplate( )".

The hyperlink address string disclosed herein could combine hyperlinking and printing within the same first and second attributes in the string such as: <a href="javascriptwindow.print( ) window.close( )">Click to Print This Page</a>, consisting of an applet to send the displayed content to a separate window for printing wherein window.close( ); may be added to automatically close the print dialogue window after printing. In particular, the window:print( ) applet is both hyperlinked to and pre-defines the content to be printed. In said string structure, "pagePrint ([URL])" or "framePrint([frame name or ID])" may replace "window.print( )" to define the printable output. An alternative structure of said first attribute and second attribute may be <a onClick="window.print( );". Another embodiment of said first and/or second attributes in said hyperlink address string may include <a onClick="document.getElementById(' [Content ID]') printWithDialog( )".

The attribute class="Print" may comprise said second attribute defining printable output of hyperlinked content referenced in said first attribute. Said attribute may characterize content located at a block or division or an individual cell in a table in a document as printable content.

In said print to paper embodiment of the invention, the hyperlinking and printing means may comprise means for acquiring print data included in broadcast waves such as via a transport stream in an object carousel and requesting the print data be printed to paper, means for capturing data broadcast images that are being displayed and requesting the data broadcast images be printed to paper and means for accessing print data stored in servers on the Internet and requesting said print data be printed to paper.

B. Print to File Printing

Second Exemplary Embodiment

This embodiment of the invention is described in terms of a cable television system implementation of the invention. It is understood that the scope of the invention applies to equivalent systems in broadcast or satellite television or radio implementations of the invention.

Digital cable television technology is characterized by set top box (STB) receivers receiving program signal transmissions from a local head-end. In accessing the transmissions, STB receivers may connect with a servlet located at a predetermined URL, a hyperlink address, to access a given web page corresponding to cable television program material. Once connected to the servlet, a PrintWriter class may be activated to print to the STB screen the web page corresponding to the program material.

The second embodiment of the invention is a print to file application preferably using PrintWriter or equivalent means to process and display (print) content on a screen or to a file or OutputStream. As demonstrated in the FIG. 3, this print to file application may entail processing one or more PrintWriter attributes to print text data to a character stream, PrintWriter writer=response.getWriter( ) 7B, writer.println("</body></html>"); 8B and/or ServletOutputStream out=response.getOutputStream( ); 9B along with the attribute 6B indicating the predetermined hyperlink address to the predetermined hyperlinked content. In FIG. 3, said predetermined hyperlink address is, for demonstrative purposes only, http://PrintHD.TV/text-2/ad/ad2.asp?ID=7072 6B, a web page coupon.

A servlet element has dynamic properties representing the servlet parameters, which are defined using a servlet parameter declaration. Servlet parameters are generated and transmitted in the servlet-STB client connection. Said parameters specify parameters for STB hyperlink access to the servlet. The one or a plurality of predetermined parameters defining the pre-defined printable output of the predetermined hyperlinked content indicated in the second attribute may include one or more servlet parameters.

The PrintWriter also has parameters for various methods defined in the Java programming language. PrintWriter parameters for using methods in java.awt include:
Component.list(PrintWriter out) to print a listing to a specified print writer;
Component.list(PrintWriter out, int indent) to print out a list, starting at the specified indention, to a specified print writer or Container.list(PrintWriter out, int indent) to print out a list, starting at the specified indention, to the specified print writer. PrintWriter parameters using methods in java.lang include:
Throwable.printStackTrace(PrintWriter s) to print this Throwable and its backtrace to a specified print writer;
ExceptionInInitializerError.printStackTrace(PrintWriter pw) to print the stack trace of the exception that occurred to the specified print writer or
ClassNotFoundException.printStackTrace(PrintWriter pw) to print the stack backtrace to a specified print writer. PrintWriter parameters using methods in java.lang.reflect include:
InvocationTargetException.printStackTrace(PrintWriter pw) to print the stack trace of the thrown target exception to a specified print writer or
UndeclaredThrowableException.printStackTrace(PrintWriter pw) to print this UndeclaredThrowableException and its backtrace to a specified PrintWriter.

A PrintWriter parameter using methods in java.rmi includes:
RemoteException.printStackTrace(PrintWriter pw) to print the composite message and the embedded stack trace to a specified print writer pw. A PrintWriter parameter using methods in java.rmi.activation includes:
ActivationException.printStackTrace(PrintWriter pw) to print the composite message and the embedded stack trace to the specified print writer pw. A PrintWriter parameter using methods in java.rmi.server includes:
ServerCloneException.printStackTrace(PrintWriter pw) to print the composite message and the embedded stack trace to the specified writer pw. A PrintWriter parameter using methods in java.security includes:
PrivilegedActionException.printStackTrace(PrintWriter pw) to print the stack trace of the exception that occurred to the specified print writer. A PrintWriter parameter using methods in java.sql includes: DriverManager.getLogWriter( ). A PrintWriter parameter using methods in java.sql includes: DriverManager.setLogWriter(PrintWriter out) to set the logging/tracing PrintWriter object that is used by the DriverManager and all drivers.
A PrintWriter parameter using methods in java.util includes:
Properties.list(PrintWriter out) to print a property list out to a specified output stream. A PrintWriter parameter using methods in javax.naming includes:
NamingException.printStackTrace(PrintWriter pw) to print this exception's stack trace to a print writer. The one or a plurality of predetermined parameters defining the pre-defined printable output of the predetermined hyperlinked content indicated in the second attribute may include one or more PrintWriter parameters.

The server computer passes objects that implement the "HttpRequest", while the servlet returns an "HttpResponse" object. The "ServletContext" interface is used to exchange information with the server environment. Some of the methods on the "ServletContext" object are "Getserver( )" and "GetServlets( )". "GetServer" returns a pointer to the parent server within which the instantiated Httpservlet runs. Using this pointer, the HttpServlet object can find out information about its parent server. The "GetServlet" method returns pointers to the servlets running on the parent server. The "ServerProperties" interface is used to exchange information regarding specific server properties established by a server administrator.

The service method is provided with Request and Response parameters included in the one or more predetermined parameters defining the pre-defined printable output of the predetermined hyperlinked content indicated in the second attribute in the hyperlink address string. These parameters encapsulate the data sent by the client, thereby allowing servlets to report status information such as errors. Servlets normally retrieve most of their parameters through an input stream, and send their responses using an output stream: ServletInputStream in=request.getInputStream ( ): ServletOutputStream out=response.getOutputStream ( ); These input and output streams may be used with data in whatever format is appropriate. For example, an applet and servlet might exchange data using object serialization, HTML, or any number of image formats.

Since servlets are JAVA objects, they have instance-specific data. This means that in effect servlets are independent applications running within servers, without needing the complexity of additional classes (which are required by some alternative server extension APIs). Servlets have access to some servlet-specific configuration data at initialization time. This allows different instances of the same servlet class to be initialized with different data, and be managed as differently named servlets. The data provided at initialization time includes an area where each instance keeps its persistent instance-specific state.

In a servlet-client structure, the hyperlink address to the servlet may indicate attributes and values for printing the hyperlinked content at the servlet to the client screen or a file as in the following a sample snippet of a Servlet.

```
TABLE-US-00001 response.setBufferSize ("8*1024");
response.setContentSize ("text/html"); PrintWriter
out = response.getWriter ( ); out.println ("<HTML>");
out.println ("<HEAD> <TITLE> Servlet
Output</TITLE> </HEAD>"); out.println
("<BODY>"); out.println ("<P> Welcome To
this World </P>"); out.println
("</BODY>"); out println ("</HTML>");
```

In this example, the page 36 hyperlinked to is defined between the <HTML> and </HTML> tags. In one embodiment disclosed herein, this is the same page 36 that is printed to 37 (displayed on) STB client screen (NOT SHOWN).

Servlets support the familiar programming model of accepting requests and generating responses. The following is a simple servlet defining a single method called "service".

```
TABLE-US-00002 import java.servlet.*; public class MyServlet extends
GenericServlet
{ public void service ( ServletRequest request, ServletResponse
response ) throws ServletException, IOException { ... } ... }
```

Building upon the previous simple servlet example, the following program code is an example of a servlet that is used to send Hypertext Markup Language (HTML) text when it is invoked.

```
TABLE-US-00003 public class SimpleServlet extends
GenericServlet { public void service(ServletRequest req,
ServletResponse res) throws ServletException, IOException
{ res.setContentType("text/html"); PrintWriter out = new
PrintWriter(res.getOutputStream( ));
out.println("<HEAD><TITLE> SimpleServlet
Output </TITLE></HEAD><BODY>");
out.println("<h1> SimpleServlet Output
</h1>"); out.println("<P>This is output from SimpleServlet.");
out.println("</BODY>"); out.flush( ); } public String
getServletInfo( ) { return "A simple servlet"; } }
```

The following servlet code implements asynchronous chat functionality.

```
public class ChatServlet
    extends HttpServlet implements CometProcessor {
    protected ArrayList<HttpServletResponse> connections =
        new ArrayList<HttpServletResponse>( );
    protected MessageSender messageSender = null;
    public void init( ) throws ServletException {
        messageSender = new MessageSender( );
        Thread messageSenderThread =
            new Thread(messageSender, "MessageSender[" +
getServletContext( ).getContextPath( ) + "]");
        messageSenderThread.setDaemon(true);
        messageSenderThread.start( );
    }
    public void destroy( ) {
        connections.clear( );
        messageSender.stop( );
        messageSender = null;
    }
    /**
     * Process the given Comet event.
     *
     * @param event The Comet event that will be processed
     * @throws IOException
     * @throws ServletException
     */
    public void event(CometEvent event)
        throws IOException, ServletException {
        HttpServletRequest request = event.getHttpServletRequest( );
        HttpServletResponse response = event.getHttpServletResponse( );
        if (event.getEventType( ) == CometEvent.EventType.BEGIN) {
            log("Begin for session: " +
request.getSession(true).getId( ));
            PrintWriter writer = response.getWriter( );
            writer.println("<!doctype html public \"-//w3c//dtd html
4.0 transitional//en\">");
            writer.println("<head><title>JSP Chat</title></head><body
bgcolor=\"#FFFFFF\">");
            writer.flush( );
            synchronized(connections) {
                connections.add(response);
            }
        } else
        if (event.getEventType( ) == CometEvent.EventType.ERROR)
{
            log("Error for session: " +
request.getSession(true).getId( ));
            synchronized(connections) {
                connections.remove(response);
            }
            event.close( );
        } else
        if (event.getEventType( ) == CometEvent.EventType.END) {
            log("End for session: " +
request.getSession(true).getId( ));
            synchronized(connections) {
                connections.remove(response);
            }
            PrintWriter writer = response.getWriter( );
            writer.println("</body></html>");
            event.close( );
        } else
        if (event.getEventType( ) == CometEvent.EventType.READ) {
            InputStream is = request.getInputStream( );
            byte[ ] buf = new byte[512];
            do {
                int n = is.read(buf); //can throw an IOException
                if (n > 0) {
                    log("Read " + n + " bytes: " + new String(buf, 0,
n)
                        + " for session: " +
request.getSession(true).getId( ));
                } else if (n < 0) {
                    error(event, request, response);
                    return;
                }
            } while (is.available( ) > 0);
```

-continued

```
    }
}
public class MessageSender implements Runnable {
    protected boolean running = true;
    protected ArrayList<String> messages = new ArrayList<String>( );
    public MessageSender( ) {
    }
    public void stop( ) {
        running = false;
    }
    /**
     * Add message for sending.
     */
    public void send(String user, String message) {
        synchronized (messages) {
            messages.add("[" + user + "]: " + message);
            messages.notify( );
        }
    }
    public void run( ) {
        while (running) {
            if (messages.size( ) == 0) {
                try {
                    synchronized (messages) {
                        messages.wait( );
                    }
                } catch (InterruptedException e) {
                    // Ignore
                }
            }
            synchronized (connections) {
                String[ ] pendingMessages = null;
                synchronized (messages) {
                    pendingMessages = messages.toArray(new String[0]);
                    messages.clear( );
                }
                // Send any pending message on all the open connections
                for (int i = 0; i < connections.size( ); i++) {
                    try {
                        PrintWriter writer = connections.get(i).getWriter( );
                        for (int j = 0; j < pendingMessages.length; j++) {
                            writer.println(pendingMessages[j] + "<br>");
                        }
                        writer.flush( );
                    } catch (IOException e) {
                        log("IOExeption sending message", e);
                    }
                }
            }
        }
    }
}
```

A servlet is typically instantiated on server startup. In the alternative, the servlet may be instantiated under a predetermined set of conditions or by client invocation. The servlet may be instantiated and executed by using its URL (e.g., http://hostkservlet URL>). The http protocol supports the passing of arguments, thus, arguments may be passed to the servlet (e.g., http://hostkservlet URL>?<arguments>). The properties object is a JAVA programming language properties class which comprises a set of "name:value" pairs. A system administrator can pass arguments to an instantiated HttpServlet object through the properties object. In this way, the system administrator can "customize" an HttpServlet for a particular server at a particular site. For example, the system administrator can pass the Httpservlet object site specific information about the network location of a database which stores documents that will be requested by client processes across the network or the amount of memory available in system buffers which will be used for processing the server administrator.

Java Server Pages (JSPs) are an extension to the Java servlet technology from Sun Microsystems that allows HyperText Markup Language (HTML) code to be combined with Java code on the same page. The Java provides the processing and the HTML provides the page layout that will be rendered in the Web browser. To process all JSP elements, e.g., directive elements, action elements, and scripting elements, in the JSP page, the container first turns the JSP page into a servlet (known as the JSP page implementation class). The conversion involves converting all template text to println( ) statements and all JSP elements are converted to Java code that implements the corresponding dynamic behavior. The container then compiles the servlet class. The STB client hyperlinking to the page causes PrintWriter to print pre-defined printable output of hyperlinked content to STB client display screen.

In the servlet-STB client connection, the servlet is a web service interface to a library allowing dynamic MIDlets to be served over the Internet using an over-the-air protocol. The function of the servlet is to dynamically generate a MIDlet in response to specifications in a HTTP request. The HTTP request contains a URL for the requested MIDlet.

The web server hosting the servlet supports the above-noted Java Servlet Specification (Ver. 2.3 or higher). The servlet uses the web server's log file to log its operations and error states. Sessions are managed by the web server, using query string hashing. Using the same mechanism, the servlet creates user specific JAR files, preventing multiple requests from overriding one another. The one or more parameters defining the pre-defined printable output of the predetermined hyperlinked content at the servlet may define PrintWriter behavior for printing the coupon characters to the STB client screen during the playing of the associated spot.

MIDML defines a generic screen element. A screen element has an attribute "name", which is the name of the screen. An attribute "source" refers to the source MIDP-1.0/MT-DML. An attribute "title" is the title of the screen. An attribute "ticker" refers to a ticker element. An attribute "persist" is a persistence flag. A screen element has an event handler "on Load", which responds to an indication to load the screen element. An event handler "onunload" responds to an indication to unload the screen element.

A form is a screen that contains an arbitrary mixture of items: images, read-only text fields, editable text fields, editable date fields, gauges, and choice group.

A TextBox is a screen that allows the user to enter and edit text. The TextBox has an attribute "maxSize", which is the maximum size of the text. An attribute "constraint" holds MIDP-1.0 text constraints, and has one of the values ANY, EMAILADDR, NUMERIC, PASSWORD, PHONENUMBER, and URL. A property "message" holds the screen's message. A property "image" represents an associated image. A property "sound" represents a sound associated with the TextBox.

A list or list class is a screen containing a list of choices. The list has an attribute "context", which holds one of the MIDP-1.0 choice context values SINGLE, and MULTIPLE. A property "choices" holds a list of choices. A property "selectedindex" holds an integer, pointing to a currently selected choice element. The value −1 indicates that no selection has been made. A property "selectedText" holds the currently selected choice text. An event "on Select" is triggered when the List-Screen choices context is updated, i.e., when the selected choice changes. The event "on Select" can be triggered in both SINGLE and MULTIPLE choice contexts.

Servlet Connectivity Support.

MIDML defines a servlet element to enable a developer to create interconnected applications. MIDML is thus able to exploit the Internet. It is possible, too, for the developer to specify execution of remote process, including passing of parameters and retrieving of data.

MIDML currently supports two types of servlets. The design of the servlet mechanism is generic and is reflected in the schema definition of the servlet object.

The generic servlet has an attribute "protocol", which defines the protocol used by the servlet. An attribute "http-method" has one of the values GET, POST, and HEAD, which refer to standard HTTP methods. A URL of the servlet is specified by an attribute "URL" 6B.

This generic mechanism also allows activation of a servlet with no protocol. It is possible to activate the servlet without checking the servlet response, using the value "NONE" as the protocol attribute, and the POST method as the http-method attribute.

A text servlet is a servlet, which returns simple text that can be displayed to the user using widgets. In one embodiment of the invention, a text servlet with the URL http://PrintHD.TV/text-2/ad/ad2.asp?ID=7072 6A may generate the text for the coupon fields in INDIVIDUAL WEB PAGE FOR EACH ADVERTISER COUPON WITH COUPON FIELDS INCLUDING ADVERTISER NAME, DISCOUNT, DESCRIPTION AND EXPIRATION DATE 4. Said text may be generated using the MIDML text formatting tag and font attributes for text: font type; size (small, medium, large); style (bold, underlined, italic); face (proportional, monospace, system).

Once a servlet has been defined, it is activated using the following syntax.

```
<activateServlet servlet="sampleServlet"/>
```

Operation of the parser involves invoking a XML ParserValidator to verify the source MIDML files against schema definitions. Once the source is validated, the parser builds the project descriptor object. The project descriptor object describes a valid and parsed MIDML application using a tree structure. The tree hierarchy is identical to the original MIDML (*.midml) source code structure. The project descriptor object provides an association between the parser and the generator, and with application meta-data in the JAD file (*.jad). The project descriptor object is exposed to the developer. The project descriptor object is thus a wrapper for an entire MIDML project. It consists of two objects: an object AppMetaDescriptor, which is a JAD data wrapper, and a MIDML descriptor object model (MDOM), which is a tree oriented data structure that is disclosed in further detail hereinbelow. The descriptor object model includes elements, or readers, that can include objects that are adapted to ultimately induce generation of the following application building blocks by a code generator: MIDlet application structure; screens; widgets; events; operations; variables; and extensible elements. The objects include instance-specific data needed to generate the code. The code generation mechanism includes additional, non-instance specific data. The objects can represent multiple versions of the same building blocks that are parametrically different. For example, parametrically different screens have parameters that may include the position of a label, and the text that is displayed on the screen. These items typically vary among different screens.

The developer develops the MIDML Application and deploys it in an accessible web-server or file server. Either the developer or the end user can initiate the servlet by sending a HTTP request that is associated with the URL of the servlet. The HTPP request parameters indicate the URL for the requested MIDML application, and also includes generation directives for the compiler, so that the updated version of the MIDlet can be recompiled as appropriate.

MIDML data variables can be initialized via external parameters that are supplied once the MIDML application has been parsed and compiled. The external parameters may be supplied using a string initialization mechanism. MIDML defines a method to activate a link to an application page upon a triggered event.

MIDML defines a method to activate an arbitrary event handler upon a triggered event. MIDML defines a method to invoke Servlet calls upon a triggered event. MIDML supports page heading formats. MIDML supports line breaks within a MIDlet screen. MIDML supports a form tag as a collection of user interface widgets. The MIDML form supports a SUBMIT operation, which sends all the form's widget data to a specified link. MIDML enables the user to specify a resource location using a URL. MIDML defines a tag for a simple Boolean servlet activation. MIDML defines a tag for a text servlet activation. The library generates the MIDlet Java code from a valid MIDML starting point. The library generates the MIDlet application descriptor file (JAD). The compiler input flag is a URL or a file system path, specifying the MIDML application starting point file. The compiler has a MIDML parameters directive. The compiler has a directive to indicate packing of external classes within the generated MIDlet package (JAR).

The servlet does not generate a new MIDlet if the MIDlet requested is consistent with the cached MIDlet. MIDlet consistency is defined in terms of: file time-stamp; application descriptor information; MIDML parameters; and user agent information. This demonstrates the key importance of MIDML parameters in the servlet-STB client system. The servlet logs the following data: number of requests per MIDlet; number of created MIDlets; and number of MIDlet generation failures; and response time. Tracking of ad-coupon effectiveness is enabled via MIDlet tracking. The servlet input flag is a URL or a file system path, specifying the MIDML application starting point file. The servlet output flag is a file system path indicating the location of the resulting MIDlet JAD and JAR files. The servlet has a MIDML parameters directive.

Website www//PrintHD.TV receives the client request and determines that the client is requesting published Web page 36. As a result, Website www//PrintHD.TV retrieves Web page 36. The Web page 36, being a Java Server Page, is converted into servlet http://PrintHD.TV/text-2/ad/ad2.asp?ID=7072. Servlet http://PrintHD.TV/text-2/ad/ad2.asp?ID=7072 includes dynamic content which is written in the Java programming language and adapted to be executed by a Java Virtual Machine (JVM) running on the Web client's computer system. Servlet http://PrintHD.TV/text-2/ad/ad2.asp?ID=7072 also includes static content, such as standard HTML or XML code. Resulting servlet http://PrintHD.TV/text-2/ad/ad2.asp?ID=7072 is executed and writes a combination of static and dynamic text to the response object. That text, in turn, is returned to the STB client as response. STB client receives response and the resulting dynamic and static content is displayed using the client's browser software and a Java Virtual Machine on the client's computer used to process the dynamic content. In this embodiment of the invention, the STB client hyperlinking step causes servlet http://PrintHD.TV/text-2/ad/ad2.asp?ID=7072 to print the text to the STB client to display pre-defined printable content on STB client screen.

In this embodiment, the first attribute identifying predetermined hyperlink address to predetermined hyperlinked content may be a resource identifier to identify a resource related to a Java Virtual Machine (JVM) and an application executed in the JVM, said resource identified by a resource management system comprising: a resource consumer management unit which generates a resource consumer for each of threads, wherein the resource consumer uses a resource; and a resource allocation policy manager which defines a resource identifier enabling an arbitrary resource to be uniquely identified, generates one or more resource manager for each resource identifier, wherein the at least one resource manager manages a resource, and sets a resource usage quota related to a resource identifier and a resource consumer, according to a request by the resource consumer management unit; wherein the resource manager calculates a quantity of resource usage by resource consumers generated for all applications and threads in the applications, stores the calculated quantity of resource usage, and informs about the quantity of resource usage wherein the resource identifier and the resource manager are generated by using Java language, said resource identifier comprises a unique identifier related to an application that is to be executed; storing the unique identifier; setting a resource allocation policy calling a resource identifier that is in an initial array position of a list in which resource identifiers uniquely identifying resources are arrayed; if the resource identifier exists in the initial array position, generating a resource manager related to the resource identifier that is a resource, setting a maximum usage value that is a quota related to the generated resource manager, registering the resource manager in a resource manager registry in which registered resource managers are stored according to types, and storing information on the generated resource manager and application identifier; and starting an application, and changing a state of the application according to a lifecycle of the application, said resource identified from a plurality of resources of threads by treating all of the threads performed in a Java Virtual Machine (JVM) as resource consumers, the method comprising: generating modified JVM threads related to the threads; wherein the generating the modified JVM threads comprises: calling a start( ) method of a certain thread object; requesting resource consumer object allocation for the certain thread object; generating a new resource consumer object according to the request, and obtaining an identifier of an application in which the certain thread object belongs; transferring information on the generated new resource consumer object and the application identifier, and requesting setting of a resource allocation policy for a corresponding resource consumer; and if the setting of the resource allocation policy for the corresponding resource consumer is ended, performing a run( ) function of the thread object and generating a native thread, said resource identified by a resource allocation policy comprising: requesting an initial resource identifier that is first on an array in a resource identifiers list; if a position for the initial resource identifier is not empty, having an identifier of an application to which a resource consumer related to a resource belongs, and obtaining a resource manager allocated to the resource; registering a resource consumer in the obtained resource manager; and setting a maximum value that may be used by the resource consumer.

Said predetermined hyperlink address is for a request for dynamically generated information from a client computer of a client-server network designating a thread to handle said request mapped, with said thread, said request to a selected servlet object of a plurality of instantiated servlet objects to invoke said selected servlet object to dynamically generate information to pass said dynamically generated information to said client computer wherein said mapping step includes the step of mapping said request to a selected servlet on a remote server computer wherein said invoking step includes the step of invoking said selected servlet object from said remote server computer to dynamically generate information.

Further, said predetermined hyperlink address may comprise a request from a client computer of said client-server network, said request requiring dynamically generated information from a servlet object of said client-server network to upload from a remote server computer of said client-server network a specified servlet object corresponding to said request and execute said specified servlet object to obtain dynamically generated information corresponding to said request wherein said specified servlet object and an application program interface are specified as object bytecodes in the JAVA programming language to send said dynamically generated information from said web server to said client computer wherein said local server computer stores a plurality of servlet objects, each of said servlet objects continuously operating until invoked in response to a specified request from a client computer wherein said plurality of servlet objects pass data to one another, said data passed may comprise one or more parameters indicated in said second attribute defining said pre-defined printable output of said predetermined hyperlinked content wherein selected servlet objects of said plurality of servlet objects are instantiated in response to said first attribute indicating said predetermined hyperlink address comprising an activated servlet URL wherein said second attribute one or more parameters comprises servlet HTML arguments including PrintStream out=new PrintStream(res-.getOutputStream( )); out.println("<html>"); out.println, parameters which were passed through standard HTML forms, including the HTTP method to be performed and the URI, which identifies the destination of the request, said predetermined hyperlink address comprising a request for dynamically generated information from a servlet object of said server computer indicating a servlet URL corresponding to said request, said servlet URL comprising arguments including said one or more parameters identifying said pre-defined printable output of said predetermined hyperlinked content indicated in said second attribute, said predetermined hyperlink address to a specified servlet object to obtain dynamically generated information corresponding to said request to pass said dynamically generated information to said client computer from a remote server computer storing a set of servlet objects that can be passed to said server computer storing a plurality of servlet objects, each of said servlet objects continuously operating until invoked in response to a specified request from said client computer.

Clearly, numerous modifications and variations of the instant invention are possible in light of the above teachings. It is therefore understood that, within the scope and spirit of the claims made herein, the invention may be practiced otherwise than as specifically described herein and the invention may be modified in arrangement and detail without departing from such scope and spirit.

What is claimed is:

1. A computer-implemented system having a processor for processing an hyperlink address string in conjunction with program signals representative of predetermined program material for hyperlinking to a resource in an initial array position of a list in which resource identifiers uniquely identifying resources corresponding to said predetermined program material are arrayed printing predetermined printable output of said resource in an initial array position of a list in which resource identifiers uniquely identifying resources corresponding to said predetermined program material are arrayed, said system comprising:

means for generating said hyperlink address string including a first attribute indicating a predetermined hyperlink address comprising a resource identifier identifying said resource in an initial array position of a list in which resource identifiers uniquely identifying resources corresponding to said predetermined program material are arrayed and a second attribute indicating one or a plurality of predetermined parameters defining said predetermined printable output of said resource in an initial array position of a list in which resource identifiers uniquely identifying resources corresponding to said predetermined program material are arrayed;

means for encoding operably coupled to said means for generating for encoding said hyperlink address string for transmission in conjunction with said program signals representative of said predetermined program material via means for transmitting program- related signals;

said means for transmitting program-related signals operably coupled to said means for encoding for transmitting said hyperlink address string in conjunction with said program signals representative of said predetermined program material to means for receiving program-related signals;

said means for receiving program-related signals for receiving said hyperlink address string in conjunction with said program signals representative of said predetermined program material;

means for processing via said processor operably coupled to said means for receiving program-related signals for processing said hyperlink address string in conjunction with said program signals representative of said predetermined program material for hyperlinking to said resource in an initial array position of a list in which resource identifiers uniquely identifying resources corresponding to said predetermined program material are arrayed printing said predetermined printable output of said resource in an initial array position of a list in which resource identifiers uniquely identifying resources corresponding to said predetermined program material are arrayed: A) processing said predetermined hyperlink address indicated in said first attribute to hyperlink to said resource in an initial array position of a list in which resource identifiers uniquely identifying resources corresponding to said predetermined program material are arrayed and B) processing said one or a plurality of predetermined parameters defining said predetermined printable output of said resource in an initial array position of a list in which resource identifiers uniquely identifying resources corresponding to said predetermined program material are arrayed indicated in said second attribute for said hyperlinking to said resource in an initial array position of a list in which resource identifiers uniquely identifying resources corresponding to said predetermined program material are arrayed printing said predetermined printable output of said resource in an initial array position of a list in which resource identifiers uniquely identifying resources corresponding to said predetermined program material are arrayed indicated in said second attribute;

means for hyperlinking operably coupled to said means for processing for hyperlinking to said resource in an initial array position of a list in which resource identifiers uniquely identifying resources corresponding to said predetermined program material are arrayed wherein said hyperlinking to said resource in an initial array position of a list in which resource identifiers uniquely identifying resources corresponding to said predetermined program material are arrayed prints said predetermined printable output of said resource in an initial array position of a list in which resource identifiers uniquely identifying resources corresponding to said predetermined program material are arrayed according to said one or a plurality of predetermined parameters defining said predetermined printable output of said resource in an initial array position of a list in which resource identifiers uniquely identifying resources corresponding to said predetermined program material are arrayed indicated in said second attribute and means for printing operably coupled to said means for processing for printing said predetermined printable output of said resource in an initial array position of a list in which resource identifiers uniquely identifying resources corresponding to said predetermined program material are arrayed according to said one or a plurality of predetermined parameters defining said predetermined printable output of said resource in an initial array position of a list in which resource identifiers uniquely identifying resources corresponding to said predetermined program material are arrayed indicated in said second attribute.

2. A computer-implemented method deploying a generator for generating an hyperlink address string for transmission in conjunction with program signals representative of predetermined program material for hyperlinking to a resource in an initial array position of a list in which resource identifiers uniquely identifying resources corresponding to said predetermined program material are arrayed printing predetermined printable output of said resource in an initial array position of a list in which resource identifiers uniquely identifying resources corresponding to said predetermined program material are arrayed, said method including the step of:

generating said hyperlink address string via said generator for said transmission in conjunction with said program signals representative of said predetermined program material including a first attribute indicating a predetermined hyperlink address comprising a resource identifier identifying said resource in an initial array position of a list in which resource identifiers uniquely identifying resources corresponding to said predetermined program material are arrayed and a second attribute indicating one or a plurality of predetermined parameters defining said predetermined printable output of said resource in an initial array position of a list in which resource identifiers uniquely identifying resources corresponding to said predetermined program material are arrayed.

3. The method of claim 2 wherein said hyperlink address string comprises a character string and said resource identifier identifying said resource in an initial array position of a list in which resource identifiers uniquely identifying resources corresponding to said predetermined program material are arrayed comprises an URI or URL.

4. The method of claim 2 wherein said hyperlink address string is structured as a PrintWriter method including said first attribute indicating said predetermined hyperlink address comprising said resource identifier identifying said resource in an initial array position of a list in which resource identifiers uniquely identifying resources corresponding to said predetermined program material are arrayed and said second attribute indicating said one or a plurality of predetermined parameters defining said predetermined printable output of said resource in an initial array position of a list in which resource identifiers uniquely identifying resources corresponding to said predetermined program material are arrayed wherein said resource in an initial array position of a list in which resource identifiers uniquely identifying resources corresponding to said predetermined program material are arrayed is defined within a print() or println() statement of said PrintWriter method, said one or a plurality of predetermined parameters defining said predetermined printable output of said resource in an initial array position of a list in which resource identifiers uniquely identifying resources corresponding to said predetermined program material are arrayed comprises at least one parameter instructing a PrintWriter to print said predetermined printable output of said resource in an initial array position of a list in which resource identifiers uniquely identifying resources corresponding to said predetermined program material are arrayed and said predetermined printable output of said resource in an initial array position of a list in which resource identifiers uniquely identifying resources corresponding to said predetermined program material are arrayed is printed via said PrintWriter.

5. The method of claim 4 wherein
said hyperlink address string is structured as a PrintWriter method having an out parameter and
said PrintWriter prints said predetermined printable output to display on a screen.

6. The method of claim 4 wherein
said hyperlink address string is structured as a PrintWriter method having a writer parameter and
said PrintWriter prints said predetermined printable output to display on a screen.

7. The method of claim 4 wherein said hyperlink address string is structured as a PrintWriter method having a pw parameter.

8. The method of claim 4 wherein
said hyperlink address string is structured as a PrintWriter method having a PrintStream parameter and
said PrintWriter prints said predetermined printable output to display on a screen.

9. The method of claim 2 wherein said predetermined hyperlink address comprises said resource identifier identifying said resource in an initial array position of a list in which resource identifiers uniquely identifying resources corresponding to said predetermined program material represented by said program signals representative of said predetermined program material are arrayed.

10. The method of claim 2 wherein said predetermined hyperlink address indicates an hyperlink address using the Http method having a predetermined value of Http Post or Http Get.

11. The method of claim 2 wherein said one or a plurality of predetermined parameters defining said predetermined printable output of said resource in an initial array position of a list in which resource identifiers uniquely identifying resources corresponding to said predetermined program material are arrayed includes a parameter defining a predetermined value of a predetermined copy control attribute of said resource in an initial array position of a list in which resource identifiers uniquely identifying resources corresponding to said predetermined program material are arrayed.

12. The method of claim 2 wherein said hyperlink address string further includes a third attribute indicating predetermined activation of both hyperlinking to said resource in an initial array position of a list in which resource identifiers uniquely identifying resources corresponding to said predetermined program material are arrayed and printing said predetermined printable output of said resource in an initial array position of a list in which resource identifiers uniquely identifying resources corresponding to said predetermined program material are arrayed.

13. The method of claim 2 further including the step of: encoding said hyperlink address string for transmission with said program signals representative of said predetermined program material.

14. A computer-implemented apparatus having a processor for processing an hyperlink address string in conjunction with program signals representative of predetermined program material for hyperlinking to a resource in an initial array position of a list in which resource identifiers uniquely identifying resources corresponding to said predetermined program material are arrayed printing predetermined printable output of said resource in an initial array position of a list in which resource identifiers uniquely identifying resources corresponding to said predetermined program material are arrayed, said apparatus comprising:

means for receiving program-related signals for receiving said hyperlink address string in conjunction with said program signals representative of said predetermined program material including a first attribute indicating a predetermined hyperlink address comprising a resource identifier identifying said resource in an initial array position of a list in which resource identifiers uniquely identifying resources corresponding to said predetermined program material are arrayed and a second attribute indicating one or a plurality of predetermined parameters defining said predetermined printable output of said resource in an initial array position of a list in which resource identifiers uniquely identifying resources corresponding to said predetermined program material are arrayed and means for processing via said processor operably coupled to said means for receiving program-related signals for processing said hyperlink address string in conjunction with said program signals representative of said predetermined program material for hyperlinking to said resource in an initial array position of a list in which resource identifiers uniquely identifying resources corresponding to said predetermined program material are arrayed printing said predetermined printable output of said resource in an initial array position of a list in which resource identifiers uniquely identifying resources corresponding to said predetermined program material are arrayed: A) processing said predetermined hyperlink address indicated in said first attribute to hyperlink to said resource in an initial array position of a list in which resource identifiers uniquely identifying resources corresponding to said predetermined program material are arrayed and B) processing said one or a plurality of predetermined parameters defining said predetermined printable output of said resource in an initial array position of a list in which resource identifiers uniquely identifying resources corresponding to said predetermined program material are arrayed indicated in said second attribute for said hyperlinking to said resource in an initial array position of a list in which resource identifiers uniquely identifying resources corresponding to said predetermined program material are arrayed printing said predetermined printable output of said resource in an initial array position of a list in which resource identifiers uniquely identifying resources corresponding to said predetermined program material are arrayed indicated in said second attribute.

15. The apparatus of claim 14 wherein said apparatus comprises a television receiver apparatus.

16. The apparatus of claim 14 wherein said apparatus comprises a radio receiver apparatus.

17. The apparatus of claim 14 wherein said apparatus comprises a media player apparatus.

18. The apparatus of claim 14 wherein said means for receiving program-related signals comprises timer means.

19. The apparatus of claim 14 wherein said predetermined hyperlink address indicates http hyperlink means.

20. The apparatus of claim 19 wherein said predetermined hyperlink address indicates said http hyperlink means comprising an Http Post or an Http Get value.

21. The apparatus of claim 14 wherein said apparatus further comprises means for hyperlinking operably coupled to said means for processing and said hyperlink address string further includes a third attribute indicating said means for hyperlinking is user-activated wherein said apparatus further comprises:
 means for storing, means for visually displaying and means for user-activating, each operably coupled to said means for processing and collectively configured for user-activating said means for hyperlinking to hyperlink to said resource in an initial array position of a list in which resource identifiers uniquely identifying resources corresponding to said predetermined program material are arrayed, said means for storing to store for predetermined time said predetermined hyperlink address and said means for visually displaying to visually display for predetermined time predetermined data to prompt said user-activating said means for hyperlinking to hyperlink to said resource in an initial array position of a list in which resource identifiers uniquely identifying resources corresponding to said predetermined program material are arrayed, both said means for storing and said means for visually displaying responsive to said third attribute, and said means for user-activating to activate said means for hyperlinking to hyperlink to said resource in an initial array position of a list in which resource identifiers uniquely identifying resources corresponding to said predetermined program material are arrayed.

22. The apparatus of claim 14 wherein said apparatus further comprises means for hyperlinking operably coupled to said means for processing and said hyperlink address string further includes a third attribute indicating said means for hyperlinking is automatically activated wherein said apparatus further comprises:
 means for automatically activating said means for hyperlinking operably coupled to said means for processing and configured for automatically activating said means for hyperlinking to automatically hyperlink to said resource in an initial array position of a list in which resource identifiers uniquely identifying resources corresponding to said predetermined program material are arrayed responsive to said third attribute.

23. The apparatus of claim 21 or 22 wherein said means for hyperlinking comprises web browser means.

24. The apparatus of claim 14 wherein said hyperlinking prints said predetermined printable output of said resource in an initial array position of a list in which resource identifiers uniquely identifying resources corresponding to said predetermined program material are arrayed via a PrintWriter.

25. The apparatus of claim 14 wherein said predetermined printable output of said resource in an initial array position of a list in which resource identifiers uniquely identifying resources corresponding to said predetermined program material are arrayed is printed to paper via XHTML-Print.

\* \* \* \* \*